Aug. 30, 1949. C. MARK, JR 2,480,490
ELECTRIC WATER DEPTH GAUGE
Filed April 11, 1945
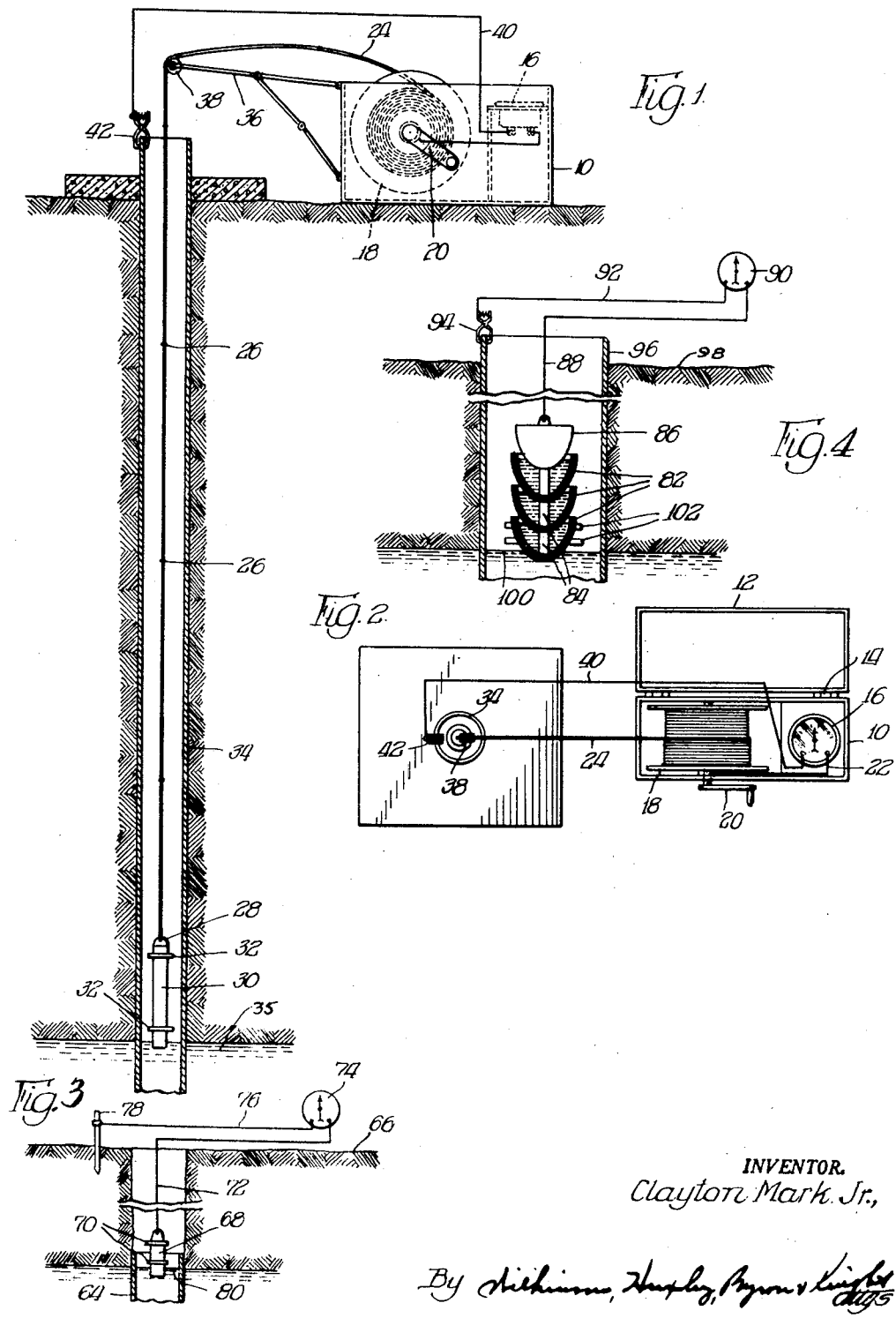
INVENTOR.
Clayton Mark Jr., Patented Aug. 30, 1949

2,480,490

UNITED STATES PATENT OFFICE 2,480,490

ELECTRIC WATER DEPTH GAUGE

Clayton Mark, Jr., Wilmette, Ill., assignor to Clayton Mark & Company, Evanston, Ill., a corporation of Delaware Application April 11, 1945, Serial No. 587,748

5 Claims. (Cl. 177—311)

1

This invention pertains to a device for measuring the depth that the water level in a well is below the ground level.

Frequently in sinking a well it is desirable to know the water level in the well below the ground level and also it is frequently desirable to know that water level in a well from time to time. In sinking a new well, successive lengths of a well casing, such as of steel or galvanized pipe are sunk. The water level within such pipe or casing may be determined electrically, but it is not always convenient to use a separate source of power because in some instances no power lines have been run in at the time the well is sunk. In other instances where separate power is provided, as by a battery, the battery is susceptible of deterioration. Where such means are used some sort of protecting means must be used for the registering instrument in case of accidental short circuit.

In different parts of the country there may be varying conditions affecting a well so for various reasons the water level should be observed from time to time. For example, during dry spells it may be advisable to know the water level so as to know how to budget the use of the water.

It is, therefore, an object of this invention to provide an electrically operated depth gauge for determining the level of water in a well which is inexpensive to manufacture, requires no separate energizing means for its operation, and is rugged, being susceptible of little or no deterioration.

Another object of the invention is to provide a compact, portable water gauge which is easily operated, and one which forms its own energizing means with the well so that no external source of power is necessary.

Another object of the invention is to provide a water gauge which furnishes its own power with the well and casing or with the well, but produces no voltage if it is accidentally shorted, so no damage is done to the indicating device.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a sectional elevation indicating a well casing and a depth gauge embodying the invention in operative position with respect to the water level in the well;

Figure 2 is a top plan view of the well casing and device illustrated in Figure 1; and Figures 3 and 5 are fragmentary elevations of modified forms of gauges embodying the invention.

Referring first of all, more particularly, to the construction illustrated in Figures 1 and 2, the gauge comprises a housing 10 having a top or closure 12 therefor, which may be conveniently hinged thereto as at 14. A suitable galvanometer 16 is mounted in the casing 10, and it has been found that a 5 milliampere meter is very successful for this type of device. A reel 18 is rotatably mounted in the casing and provided with rotating means such as the crank 20. One side of the galvanometer 16 is electrically connected as at 22 to the reel hub whereby it is electrically connected to one end of the flexible insulated covered conductor 24, which is adapted to be stored on the reel. The connection may be by a shoe or commutator arrangement.

The conductor is provided with markers 26 disposed at suitable intervals and the free end of the conductor is electrically connected as at 28 to the metallic weight 30. The weight 30 is provided with spaced insulating members 32 which act as spacers to prevent contact between the weight 30 and the side of the well casing 34 which may be of steel or galvanized pipe. The weight 30 is coated with a coating which is of different material than the inside of the well casing. For example, it has been found that where a steel or galvanized pipe has been used as a casing, the coating on the weight 30 may be silver, which is electronegative to the casing (as well as to a zinc coating), so that the weight would provide a cathode, the casing comprising the anode and the water 35 within the well forming the electrolyte.

The casing 10 may be provided with the folding frame 36 having a roller 38 thereon whereby the conductor 24 may be anti-frictionally lowered and withdrawn from the casing. The other side of the galvanometer is electrically connected to the conductor 40 having a spring clamp 42 on the end thereof which is adapted to be clamped to the casing completing the circuit.

Thus when the weight 30 is lowered into the casing, it being assumed that the conductor 40 is clamped to the casing, no indication appears on the galvanometer 16 until the weight reaches the water 35. As above pointed out the silver being electronegative, the galvanometer will always deflect in the same direction and the deflection will indicate that the water level has been reached. The markers 26 may then be read and the water level determined thereby.

Silver has been specified above because it is the most electronegative metal that can at the present be secured at low cost. Other materials, of course, may be used as electrodes, such as carbon, metal oxides and other metals, or electrodes composed of electro or metal salts may be used or the weight may comprise a series of cells. The only requisite is that the coating on the weight 30 or the weight itself be of such character with respect to the casing 34, or the coating of the casing, that a current will be generated when water is reached by the electrode 30.

Not infrequently the well casing does not extend to a point below the water level, for example as where rock is encountered, or the well casing 64 as shown in Figure 3 is disposed below the level of the ground 66. In either of those cases, an electrode 68 may be used, similar to electrode 30, having the insulating spacers 70, the electrode being of suitable material as above pointed out, and connected through a conductor 72 to one side of the galvanometer 74. The other side of the galvanometer is connected through conductor 76 to the metallic stake, such as the iron stake 78 which is driven into the ground. Thus when the water 80 is reached by the electrode 68 the circuit is completed to the galvanometer 74 causing indications thereon, and the length of conductor 72 then can be measured as before.

In the modification shown in Figure 4 an arrangement is shown to obtain a higher registration on the galvanometer, or is used as where an inexpensive and not so sensitive galvanometer is used, so as to create the effect of cells in series. In this construction the cups 82 are secured in nested relation to each other by the insulating supports 84. The cups are of suitable bimetallic construction and the upper member 86 similarly supported within the top cup is of suitable material as above referred to, said member 86 being connected through conductor 88 to one side of the galvanometer 90. The other side of the galvanometer 90 is connected through conductor 92 and clip 94 to the metallic well casing 96 extending below the ground level 98 to below the water level 100. If no well casing is available, the conductor 92 may be connected to a metallic post as described with respect to Figure 3.

When the electrode is lowered into the well the cups 82 are filled with water and so long as the bottom cup is in the water, the circuit is closed to the galvanometer, causing indication. Short circuiting is prevented by the spaced insulators 102, and it is seen that when the bottom cup is lifted from the water, the circuit is broken even though the cups are filled.

It is to be understood that this application is not to be limited by the exact embodiments of the device shown, which are merely by way of illustration and not limitation, as various and other forms of the device will, of course, be apparent to those skilled in the art without departing from the spirit of the invention or the scope of the claims.

I claim:

1. In a device for detecting the presence of fluid in a well, the combination of flexible insulated conductors, one of said conductors having one end connected to indicating mechanism and the other end thereof connected to a metallic electrode, said electrode comprising a plurality of nested cup shaped members adapted to be filled with fluid, insulating means interposed between the electrode and adjacent well walls, the adjacent surfaces of the members being of suitable material permitting current flow therebetween, said members being secured together by insulating means, an upper member within the upper cup shaped member being connected to the second end of said last named conductor, the other conductor having one end thereof connected to said indicating mechanism and the other end adapted to be grounded with respect to said electrode, whereby indication is had on said indicating mechanism when said electrode contacts the fluid.

2. In a device for detecting the presence of fluid in a well, the combination of flexible insulated conductors, one of said conductors having one end connected to indicating mechanism and the other end thereof connected to a metallic electrode, said electrode comprising a plurality of nested cup shaped bi-metallic members adapted to be filled with fluid, insulating means interposed between the electrode and adjacent well walls, the adjacent surfaces of the members being of suitable material permitting current flow therebetween, said members being secured together by insulating means, an upper member within the upper cup shaped member being connected to the second end of said last named conductor, the other conductor having one end thereof connected to said indicating mechanism and the other end adapted to be grounded with respect to said electrode, whereby indication is had on said indicating mechanism when said electrode contacts the fluid.

3. A self-exciting galvanic water-level gauge for deep wells, which derives its indicating power from a cell in which the well casing is adapted to form one electrode, the gauge including a single-conductor insulated wire of calibrated length, reeling means for handling the wire, a potential-sensitive indicator operably connected to one end of the wire and adapted to be electrically connected to the well casing, and a drop-weight mechanically and electrically connected with the other end of the wire and forming the other electrode with said casing, said weight being provided with insulating spacers to normally prevent contact with the well casing, and provided with a galvanic surface of material having an electrode potential substantially different from that of the inner surface of the well casing, whereby a potential will be generated and indicated when the weight is immersed in water within the casing, but the indicator will remain inactive upon accidental electrical contact between the weight and the casing.

4. A self-exciting galvanic water-level gauge for deep wells, which derives its indicating power from a cell in which the well casing is adapted to form one electrode, the gauge including a single-conductor insulated wire of calibrated length, reeling means for handling and storing the wire, a potential-sensitive indicator having one side thereof operably connected to one end of the wire, a conductor having one end connected to the other side of said indicator, the other end thereof being adapted to be electrically connected to the well casing, and a drop-weight mechanically and electrically connected with the other end of the wire and forming the other electrode with said casing, said weight being provided with insulating spacers to normally prevent contact with the well casing, and provided with a galvanic surface of material having an electrode potential substantially different from that of the inner surface of the well casing, whereby a potential will be generated and indicated when the weight is immersed in water within the casing, but the indicator will remain inactive upon accidental electrical contact between the weight and the casing.

5. A device for detecting the presence of fluid in a well wherein there is provided a metallic well casing which is grounded and in contact with the fluid in the well, said device comprising an electrode having a portion to be immersed in the fluid in said well, said portion being of dissimilar material to that of the casing whereby when said portion is immersed and spaced from the casing, the casing and said portion act as anode and cathode and the fluid acts as an electrolyte, spaced insulating means provided on said electrode for maintaining said electrode in spaced relation to said casing to thereby prevent shorting between said electrode and casing, a flexible, insulated conductor, calibrated with respect to length and electrically connected at one of its ends to said electrode, and electrically responsive indicating mechanism having one side electrically connected to the other end of said conductor, the other side of said indicating mechanism being adapted to be grounded whereby when said electrode comes in contact with fluid, potential difference will be indicated by said indicating mechanism.

CLAYTON MARK, Jr.

REFERENCES CITED

The following references are of record in the file of this patent:

UNITED STATES PATENTS

| Number | Name | Date |
| --- | --- | --- |
| 1,312,494 | Wheeler | Aug. 5, 1919 |
| 1,443,357 | Gardner | Jan. 30, 1923 |
| 1,497,178 | Lorenz | June 10, 1924 |
| 1,558,076 | Chamberlain | Oct. 20, 1925 |
| 2,361,064 | Schlumberger | Oct. 24, 1944 |

Certificate of Correction

Patent No. 2,480,490      August 30, 1949

CLAYTON MARK, Jr.

It is hereby certified that errors appear in the printed specification of the above numbered patent requiring correction as follows:

Column 1, line 7, for the word "that" read *the*; column 2, line 5, for "Figures 3 and 5" read *Figures 3 and 4*;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*